United States Patent [19]
Laakmann

[11] Patent Number: 5,767,954
[45] Date of Patent: Jun. 16, 1998

[54] LASER TRANSPONDER FOR DISABLING A LASER-BASED SPEED MONITOR

[75] Inventor: Peter Laakmann, Mukilteo, Wash.

[73] Assignee: Lidatek L.L.C., Mukilteo, Wash.

[21] Appl. No.: 679,078

[22] Filed: Jul. 12, 1996

Related U.S. Application Data

[63] Continuation-in-part of Ser. No. 566,646, Dec. 4, 1995.

[51] Int. Cl.$^6$ ............................... G01P 3/36; G01S 7/36; B60T 7/16
[52] U.S. Cl. ............................ 356/28; 342/14; 180/167; 356/28.5
[58] Field of Search ................... 342/13, 14; 356/28, 356/28.5, 5.01; 180/167

[56] References Cited

U.S. PATENT DOCUMENTS

| | | |
|---|---|---|
| 3,978,342 | 8/1976 | Hagen et al. |
| 4,072,949 | 2/1978 | Van Brunt |
| 5,359,404 | 10/1994 | Dunne |
| 5,406,287 | 4/1995 | Pinkus |

FOREIGN PATENT DOCUMENTS 2408058  8/1975  Germany.

OTHER PUBLICATIONS

D. Schroeder; Car & Driver; Nov. 1993, pp. 124–131.
P. Bedard; Car & Driver; pp.87–92, Apr. 1992.
B. Keirstead et al; J. of Electronic Defense; vol. 15, No. 5, May 1992.
Samuels, M. et al., "Low Cost, Handheld Lidar System for Automotive Speed Detection and Law Enforcement," *SPIE vol. 1633 Laser Radar VII*, 1992, pp. 147–159.
Miloni, Peter W. and Joseph H. Eberly., "Some Laser Applications," *Laser*, John Wiley & Sons, New York, 1988, pp. 585–589.

*Primary Examiner*—Stephen C. Buczinski
*Attorney, Agent, or Firm*—Seed and Berry LLP

[57] ABSTRACT

A laser transponder for disabling a laser-based speed monitor of the type that transmits a monitor laser beam at a moving motor vehicle. In response to detecting the monitor laser beam, a warning is output to the motor vehicle driver and a jamming laser beam is transmitted toward the speed monitor. The jamming laser beam disables the speed monitor for a time period sufficient to allow the motor vehicle driver to reduce the speed of the motor vehicle. The laser transponder includes a housing that acts as both a heat sink for the laser transmitter in the laser transponder and a structural package that is waterproof and sufficiently rugged to be positioned on the outside of the motor vehicle. The laser transponder is securely attached to the motor vehicle by a connection system that enables a user to adjust the angular orientation of the laser transponder as necessary to detect the monitor laser beam and transmit the jamming laser beam to the speed monitor.

23 Claims, 10 Drawing Sheets

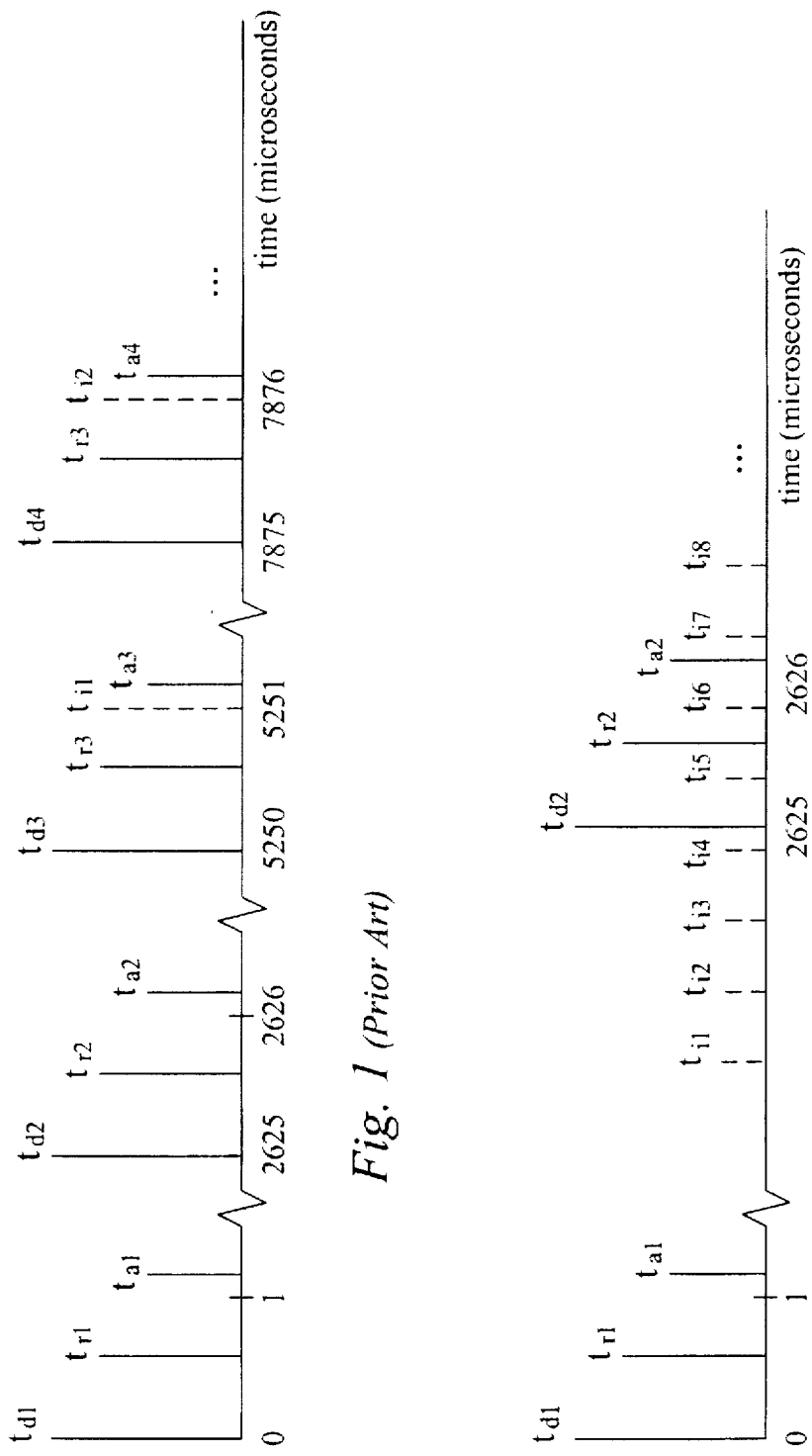

5,767,954

1

LASER TRANSPONDER FOR DISABLING A LASER-BASED SPEED MONITOR

CROSS-REFERENCE TO RELATED APPLICATION

This application is a continuation-in-part of U.S. patent application Ser. No. 08/566,646, filed Dec. 4, 1995, now pending.

TECHNICAL FIELD

The present invention relates to lasers and, more particularly, to laser transponders that disable laser-based speed monitors known as lidar velocity monitors.

BACKGROUND OF TYKE INVENTION

Police departments traditionally have employed radar speed monitors to monitor the velocities of motor vehicles. Such radar speed monitors transmit radio waves at a moving motor vehicle and receive the waves reflected back from the motor vehicle. The speed of the motor vehicle is calculated by determining the difference in time that it takes successive radio waves to return to the radar speed monitor from the motor vehicle. The radio waves transmitted by such radar speed monitors are dispersed over a large area, which causes the radio waves to be reflected off of numerous objects other than or in addition to the motor vehicle. Such reflections cause the radar speed monitor to detect false speed readings and enable the radar speed monitor to be detected by a radar detector at a significant range before the speed of a motor vehicle can be monitored.

In recent years, the radar speed monitor has been replaced by a speed monitor known as a lidar speed monitor. A lidar speed monitor operates similar to a radar speed monitor except that the lidar speed monitor reflects a laser beam off of the motor vehicle rather than radio waves. Such a laser beam is much more narrow than the radio waves transmitted by the radar speed monitor, which results in a lidar speed monitor that is much more accurate and less detectable than radar speed monitors. The increased accuracy and reduced delectability arises because the narrow laser beam is not usually reflected off objects other than a small part of the motor vehicle being monitored.

A typical lidar speed monitor transmits a monitor laser beam at a carrier frequency of $3.315 \times 10^{14}$ Hz (905 nM in wavelength). The monitor laser beam typically includes a series of pulses at a pulse repetition frequency of 380 Hz with each pulse having a pulse width of approximately 20 nanoseconds and a peak power of 50 watts. The lidar speed monitor computes the range of the vehicle from the lidar speed monitor by determining how long it takes for a pulse to travel to the vehicle and back to the lidar speed monitor and multiplies that time by the speed of light. The lidar speed monitor computes the speed of the vehicle by calculating several sequential range measurements within a predetermined time period and dividing the difference between range measurements by the time period. In current lidar devices, approximately 100 pulses are used to compute an average speed for a vehicle within an accuracy of approximately 1 mph. Given that approximately 380 pulses are transmitted each second, the current lidar devices can determine speed in as little as ⅓ of a second. With so little time, a vehicle driver is unable to slow down quickly enough to avoid detection even if the monitor laser beam from the lidar were detected instantaneously.

Some have proposed overcoming the lidar speed monitors by actively disabling them long enough for the vehicle to

2 slow down. Such proposals involve transmitting a jamming laser beam from the vehicle to the lidar speed monitor in a manner that completely disables the lidar speed monitor or causes the lidar speed monitor to calculate false speed readings. Proposed lidar jammers would operate by transmitting in the jamming laser beam a pulse train having a pulse repetition frequency that matches the pulse repetition frequency of the monitor laser beam transmitted by the lidar speed monitor. Each pulse of the pulse train is transmitted so that it arrives at the lidar speed monitor sometime within the time period beginning when the lidar speed monitor transmits a pulse and ends when the lidar speed monitor receives the pulse reflected off the vehicle. The lidar speed monitor accepts only the first laser beam pulse received after a pulse of the monitor laser beam is transmitted, so each pulse of the jamming laser beam causes the lidar speed monitor to consider the jamming laser beam pulse to be the pulse reflected off the vehicle. As a result, the lidar speed monitor computes a false speed based on the jamming laser beam pulses rather than the pulses reflected off the vehicle.

FIG. 1 is a timing diagram that shows how such prior art lidar jammers are intended to operate. At time $t_{d1}$ (0 seconds), the lidar speed monitor transmits the monitor laser beam with a laser pulse at a motor vehicle equipped with the lidar jammer. If the vehicle is 500 feet from the lidar speed monitor, then the laser pulse will be reflected off of the vehicle in approximately 0.51 microseconds ($t_{r1}$) and the reflected laser pulse will return to the lidar speed monitor after 1.16 microseconds ($t_{a1}$). Assuming that the pulse repetition frequency of the lidar speed monitor is 380 pulses per second, the lidar speed monitor transmits a second pulse at time $t_{d2}$, 2625 microseconds after the first pulse was transmitted at time $t_{d1}$. After the second pulse arrives at the vehicle at time $t_{r2}$, the lidar jammer on the vehicle can compute the pulse repetition frequency of the lidar speed monitor. Typically, the laser jammers wait to receive several pulses from the lidar speed monitor so that a more accurate determination of the pulse repetition frequency of the lidar speed monitor can be obtained. However, for the purposes of this example, it can be assumed that the pulse repetition frequency of the lidar speed monitor is determined after only two pulses. Based on the lidar jammer's determination of the pulse repetition frequency of the lidar speed monitor, the lidar jammer determines that the lidar speed monitor will transmit a pulse every 2625 microseconds beginning 5250 microseconds after the first pulse $t_{d1}$ was transmitted.

The proposed lidar jammer would attempt to create false speed readings by transmitting a pulse train having a pulse repetition frequency that matches the pulse repetition frequency of the typical lidar speed monitor (380 pulses per second) and always arrives ahead of the reflected signal. The proposed lidar jammer would transmit the first pulse of the pulse train so that it arrives at the lidar speed monitor at time $t_{i1}$ before the third pulse transmitted by the lidar speed monitor is expected to return to the lidar speed monitor at time $t_{a3}$. The lidar speed monitor would compute a range based on the time difference between sending the third pulse at time $t_{d3}$ and receiving the first inserted pulse at time $t_{i1}$, which is a shorter range than was computed based on the time difference between sending the second pulse at time $t_{d2}$ and receiving the second reflected pulse at time $t_{a2}$. The proposed lidar jammer would attempt to vary the pulse spacing to create "out of range" speed readings that would disable the lidar speed monitor.

Such proposed lidar jammers would be deficient for several reasons. First, the lidar jammer must measure the pulse repetition frequency of the monitor laser beam transmitted by the lidar speed monitor with very high accuracy, which requires expensive components and is prone to error. Second, the lidar jammer must transmit in the jamming laser beam a pulse train having a pulse repetition frequency that accurately matches the pulse repetition frequency of the monitor laser beam of the lidar speed monitor. Third, even if it were possible to accurately measure and match the pulse repetition frequency of the monitor laser beam, such lidar jammers can be defeated simply by adjusting the lidar speed monitor to transmit a pulse train having an unstable, random, or programmed pulse repetition rate.

In addition to the technical feasibility problems discussed above, several practical problems would still exist. In particular, such lidar jammers would need to be fixed to a location on the vehicle that would allow the lidar jammer to detect the monitor laser beam from the lidar speed monitor and direct the jamming laser beam at the lidar speed monitor. Moreover, there should be a simple way to accurately direct the jamming laser beam at the lidar speed monitor. Lidar speed monitors typically direct the monitor laser beam at the vehicle license plate because the monitor laser beam reflects very efficiently off of the retro-reflective paint used on most license plates. As a result, the lidar jammer must be able to withstand being positioned at or near the license plate. Therefore, the lidar jammer should be rugged enough to withstand rocks and other debris being thrown at the lidar jammer from other vehicles, should be waterproof in order to prevent moisture from damaging the circuitry of the lidar jammer, and should shield the laser transmitter of the lidar jammer from electromagnetic interference caused by the vehicle engine. In addition, the lidar jammer needs to be able to dissipate the heat produced by the lidar jammer, especially by the laser transmitter.

Prior art devices that are intended to jam lidar speed monitors are mounted adjacent the vehicle license plate. Such prior art devices include plastic housings that cannot serve as heat sinks for the internal circuitry of the devices. In addition, the plastic housings of such prior art devices typically are molded as an integral part of a license plate cover. Accordingly, such prior art devices cannot be adjusted easily by the user to compensate for any manufacturing tolerances in the circuitry of the devices or for any misalignment of the license plate cover. Moreover, the single piece housings of such prior art devices cannot be taken apart to enable the circuitry to be probed, repaired, or replaced.

SUMMARY OF THE INVENTION

The invention is directed to a laser transponder of a system for disabling a laser-based speed monitor of the type that transmits a monitor laser beam at a moving object, such as a motor vehicle. The laser transponder includes a laser detector that detects when the monitor laser beam transmitted by the speed monitor arrives at the motor vehicle. In response to detecting the monitor laser beam, a laser transmitter of the laser transponder transmits a jamming laser beam to the speed monitor. The jamming laser beam preferably includes a plurality of pulses separated from each other by a time period that is less than or equal to an amount of time needed for the monitor laser beam to travel from the speed monitor to the moving object and back to the speed monitor. While jamming the speed monitor with the jamming laser beam, the laser transponder causes a warning to be output to a driver of the motor vehicle so that the driver can reduce the speed of the motor vehicle.

In a preferred embodiment the laser transponder also includes a housing to which the laser detector and the laser transmitter are coupled. The housing has first and second sides opposite each other on the housing. Each of the first and second sides has a connector for connecting the laser transponder to the vehicle. The connectors are structured to enable the housing to pivot about a line extending through the housing between the first and second sides. In addition, each of the connectors is structured to enable the laser transponder to be disconnectible from and reconnectible to the vehicle.

Preferably, the housing is made of metal and the laser transmitter is directly affixed to and in contact with the housing so that the housing acts as a heat sink for the laser transmitter. Also, the metal housing totally encloses the laser transmitter except for an aperture through which the laser transmitter directs the jamming laser beam and the laser detector receives the monitor laser beam. A window is positioned on the housing to cover the aperture and provide a sealed enclosure within the housing to shield the laser transmitter and laser detector from electromagnetic interference. The window includes a transmitter lens and a detector lens positioned in front of the laser transmitter and the laser detector, respectively. The transmitter lens is positioned to correct for any fixed pointing errors of the laser transmitter that cause the laser transmitter to transmit the jamming laser beam inaccurately. Such laser transmitter error compensation is accomplished by positioning the transmitter lens so that an optical axis of the transmitter lens is non-parallel to the optical axis of the laser transmitter so that the transmitter lens redirects the jamming laser beam along the optical axis of the transmitter lens.

BRIEF DESCRIPTION OF THE DRAWINGS

FIG. 1 is a timing diagram showing the laser beam pulses transmitted by prior art lidar detectors.

FIG. 2 is a timing diagram showing the pulses of the jamming laser beam transmitted according to the present invention.

DETAILED DESCRIPTION OF THE INVENTION

Figure 3:
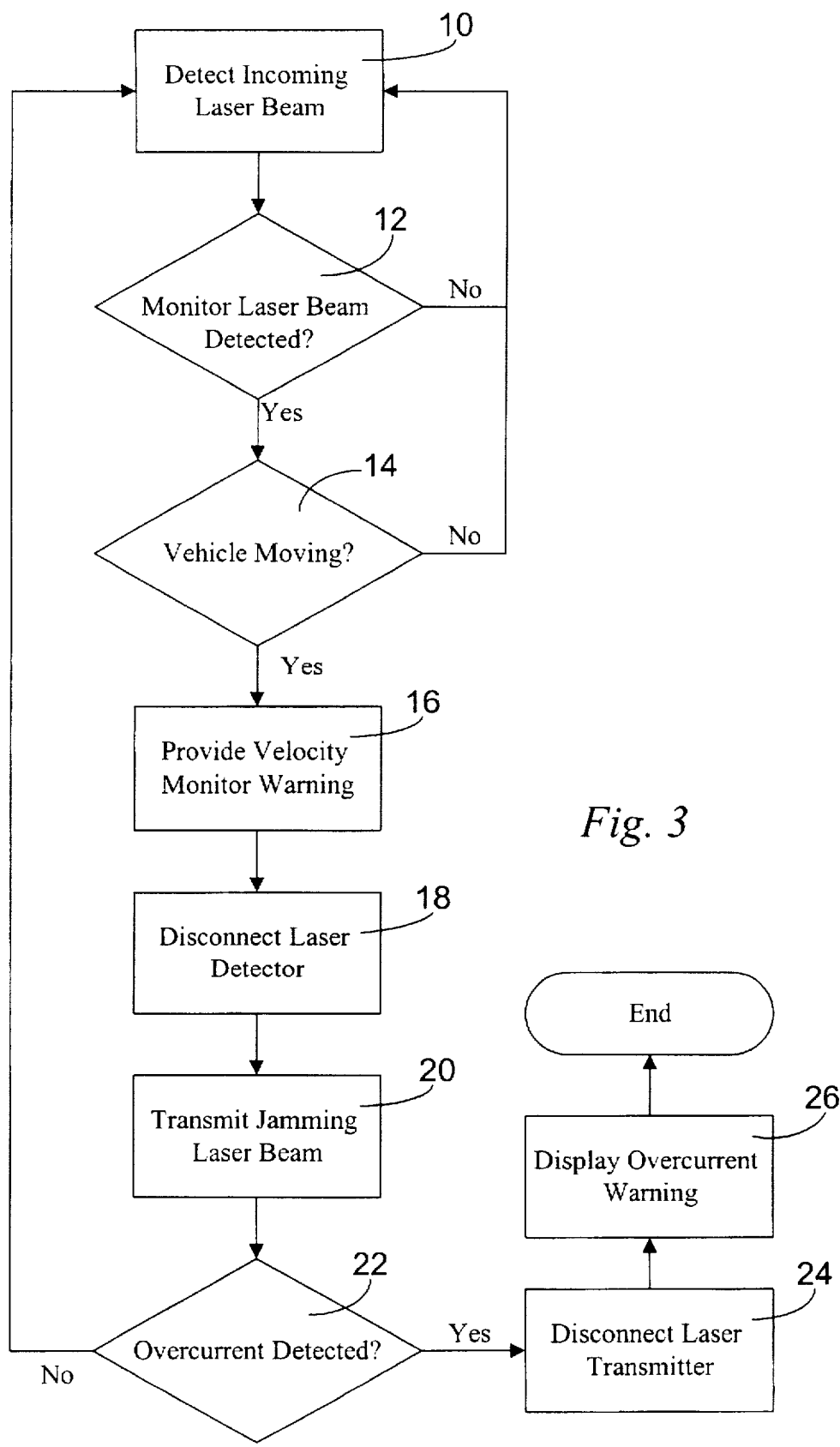
FIG. 3 is a flow diagram showing a method for temporarily disabling a speed monitor according to the present invention.

The invention is directed to a laser transponder of a system for disabling a laser-based speed monitor, known as a lidar speed monitor, that is attempting to determine the speed of a moving object, such as a motor vehicle. The laser transponder of the invention disables the lidar speed monitor by transmitting to the lidar speed monitor a jamming laser beam that includes a pulse train having a high pulse repetition frequency. The pulse repetition frequency of the pulse train transmitted according to the invention is sufficiently high to ensure that a pulse from the pulse train always reaches the lidar speed monitor before a pulse transmitted by the lidar speed monitor can be reflected off the motor vehicle and back to the lidar speed monitor.

The lidar speed monitor is disabled with the jamming laser beam without attempting to match the pulse repetition frequency of the monitor laser beam transmitted by the lidar speed monitor. A lidar speed monitor typically determines the speed of a motor vehicle between approximately 500 and 1500 feet from the motor vehicle. The speed of the monitor laser beam used to interrogate the motor vehicle is the speed of light (i.e., $9.836 \times 10^8$ feet per second). As a result, at a distance of 500 feet, the monitor laser beam has a round trip flight time of approximately 1.16 microseconds and at 1500 feet, the round trip flight time is approximately 3.48 microseconds. Thus, by transmitting in the jamming laser beam a pulse train with a constant pulse repetition frequency of approximately 0.86 MHz or greater (1/1.16 microseconds), the invention ensures that a pulse will always arrive at the lidar speed monitor before a pulse in the monitor laser beam can make the 1.16 microsecond round trip between the lidar speed monitor and the vehicle. In other words, the pulse repetition frequency of the jamming laser beam should be greater than or equal to the speed of the monitor laser beam (light speed) divided by the quantity of two times a preselected minimum distance between the lidar speed monitor and the motor vehicle (round trip distance). Although 0.86 MHz is sufficient to disable the lidar speed monitor at 500 feet, the invention preferably employs a pulse train with a pulse repetition frequency of 2 MHz to ensure that the lidar speed monitor can be disabled when the lidar speed monitor is only 250 feet from the motor vehicle.

The manner in which the laser transponder disables the lidar speed monitor can be understood more clearly with respect to the timing diagram shown in FIG. 2. The lidar speed monitor transmits a monitor laser beam with a first pulse at time $t_{d1}$. The first pulse of the monitor laser beam is reflected off the motor vehicle at time $t_{r1}$ and the reflected first pulse is detected at the lidar speed monitor at time $t_{a1}$. Assuming that the motor vehicle is 500 feet from the lidar speed monitor, the monitor laser beam takes approximately 1.16 microseconds to travel to the motor vehicle and back to the lidar speed monitor at time $t_{a1}$. Instead of trying to determine and match the pulse repetition frequency of the monitor laser beam like prior art lidar jammers, the present invention simply transmits a pulse train with a high, constant pulse repetition frequency with each pulse of the pulse train being indicated by a dashed line in FIG. 2. In the example shown in FIG. 2, the pulse repetition frequency of the inserted pulse train is 2 MHz (two million pulses per second), which ensures that at least one pulse of the pulse train arrives at the speed monitor before a pulse transmitted by the speed monitor can be reflected off of the vehicle back to the speed monitor when the speed monitor is 250 feet or more away from the vehicle. For example, the fifth inserted pulse of the pulse train arrives at the lidar speed monitor at time $t_{i5}$, which is well before a reflected second pulse of the monitor laser beam returns to the lidar speed monitor at time $t_{a2}$. It will be appreciated that the first inserted pulse arriving at the lidar speed monitor need not be the fifth inserted pulse of the jamming laser beam and instead could be any of the inserted pulses of the jamming laser beam.

A flowchart of a method for disabling the lidar speed monitor using the laser transponder of the present invention is shown in FIG. 3. In step 10 the method detects an incoming laser beam. In step 12 the method determines whether the incoming laser beam detected corresponds to a typical monitor laser beam from a lidar speed monitor. Step 12 is used to make sure that a laser beam from a source other than a lidar speed monitor does not trigger the transmission of a jamming laser beam. For example, if step 12 is not performed, then a jamming laser beam from a lidar jammer on another motor vehicle could trigger transmission of an unnecessary jamming laser beam. Therefore, if the laser beam detected does not correspond to a monitor laser beam from a typical lidar speed monitor, then the method returns to step 10 for the detection of another laser beam.

If the incoming laser beam detected is determined to be a monitor laser beam in step 12, then the method determines whether the motor vehicle is moving in step 14. If the motor vehicle is not moving, then the method returns to step 10 to detect another laser beam without transmitting a jamming laser beam. If step 14 is not included, then a lidar speed monitor could trigger a transmission of jamming laser beam from a parked car. Thus, step 14 reduces the possibility of eye damage to pedestrians walking in front of the parked car. Alternatively, step 14 could determine whether the engine of the motor vehicle was running at greater than a threshold number of revolutions per minute (RPMs). In addition, step 14 could determine whether the engine of the motor vehicle was running based on the voltage of the motor vehicle's battery.

If step 14 determines that the motor vehicle is moving, then the method provides a lidar speed monitor warning to the motor vehicle driver in step 16. The lidar speed monitor warning can be an audible warning, a visual warning, or a combination of such warnings. The warning can last for several seconds or can simply be a short burst of sound or light sufficient to indicate to the motor vehicle driver that the monitor laser beam from a lidar speed monitor has been detected.

During the provision of the lidar speed monitor warning in step 16, the method disconnects the laser detector in step 18. Further, in step 20 the method transmits the jamming laser beam to the lidar speed monitor. Disconnecting the laser detector in step 18 ensures that the jamming laser beam transmitted in step 20 does not retrigger the timer that triggers the generation of the jamming laser beam. Alternatively, one could employ a timer having a retrigger capability that is automatically disabled for some time after the timer triggers the generation of the jamming laser beam. As discussed above, the jamming laser beam includes a pulse train having a constant pulse repetition frequency sufficient to ensure that a pulse always reaches the lidar speed monitor before a pulse transmitted by the lidar speed monitor is reflected back to the lidar speed monitor (e.g., 2 MHz).

The method preferably transmits the jamming laser beam in step 20 only for a sufficient period of time to enable the motor vehicle driver to reduce the speed of the motor vehicle (e.g., 5–10 seconds). Limiting the duration of the jamming laser beam transmission reduces the possibility of injury to pedestrians in the path of the jamming laser beam. In addition, limiting the duration of the jamming laser beam transmission reduces the load on the laser transmitter and enables the use of a less expensive laser transmitter.

In step 22 the method determines whether an overcurrent condition has occurred. Such an overcurrent condition could result if the circuitry causing the jamming laser beam to be transmitted does not turn off the laser beam transmission after the predetermined time period provided to enable the motor vehicle driver to reduce the speed of the motor vehicle. Alternatively, the overcurrent condition could be caused by repeated retriggering of the laser transmitter with successive pulses. If an overcurrent condition is detected in step 22, then the method disconnects the laser transmitter from its power source in step 24. In addition, the method displays an overcurrent warning to the motor vehicle driver in step 26. If no overcurrent condition is detected, then the method simply returns to step 10 for detection of another monitor laser beam.

Figure 4:
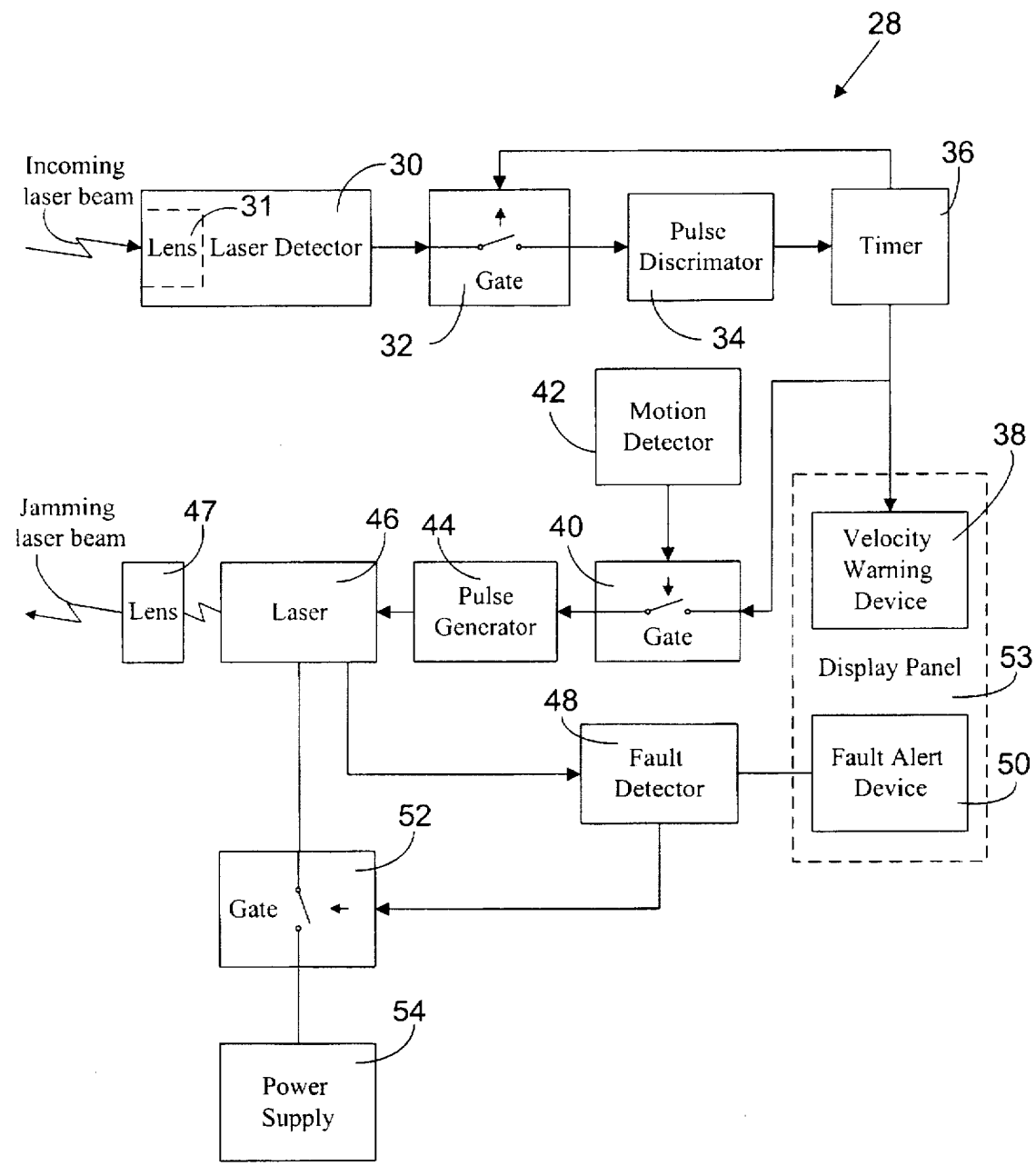
FIG. 4 is a block diagram of a laser transponder for temporarily disabling a speed monitor according to the present invention.

A laser transponder 28 for disabling the lidar speed monitor is shown in FIG. 4. The laser transponder 28 includes a laser detector 30 that detects the monitor laser beam transmitted by the lidar speed monitor. The optical divergence angle of the monitor laser beam typically is approximately 4 milliradians which gives the monitor laser beam a 2 foot cross-sectional radius at a range of 1000 feet. The primary target of the speed monitor is the motor vehicle license plate because the license plate is coated with a retro-reflective paint that results in the best reflection from typical motor vehicles. As a result, to detect the monitor laser beam, the laser detector 30 should be positioned on or immediately adjacent the motor vehicle license plate. In addition, the laser detector preferably includes a lens 31 with a relatively narrow optical acceptance angle (e.g., 20°) in order to maximize the monitor laser beam signal received by the laser detector 30.

In response to detecting the monitor laser beam from the speed monitor, the laser detector 30 outputs a detection signal. The laser transponder 28 includes a gate 32 and a pulse discriminator 34. The gate 32 is normally closed so that the detection signal from the laser detector 30 is passed on to the pulse discriminator 34. The pulse discriminator 34 determines whether the incoming laser beam detected by the laser detector 30 matches the monitor laser beam that is typically output by lidar speed monitors. If the pulse discriminator 34 determines that the incoming laser beam is a monitor laser beam, then the pulse discriminator passes the detection signal to a timer 36.

In response to the detection signal, the timer 36 transmits a timing pulse to three components of the laser transponder 28: the gate 32, a speed warning device 38, and a motion detector gate 40. The timing pulse opens the gate 32 so that the laser detector 30 is disconnected from the remainder of the laser transponder 28. As discussed above, the disconnection of the laser detector 30 prevents retriggering of the jamming laser beam by reflected pulses of the laser transponder 28. In response to the timing pulse, the speed warning device 38 outputs a visual and/or audible warning to the motor vehicle driver in order to allow the driver to reduce the speed of the motor vehicle. Preferably, the timing pulse is sufficiently long (e.g., 10 seconds) to enable the motor vehicle driver to sufficiently reduce the speed of the motor vehicle in a safe manner.

The laser transponder 28 also includes an optional motion detector 42 that senses whether the motor vehicle is in motion. Such a motion detector 42 can be implemented using many common automotive electronic devices, such as the speedometer present in all motor vehicles. Alternatively, engine RPM monitors and battery voltage monitors can be used as discussed above. When a motor vehicle is in motion, the motion detector 42 closes the motion detector gate 40 in order to enable the timing pulse to pass to a pulse generator 44.

In response to the timing pulse received from the timer 36 via the motion detector gate 40, the pulse generator 44 generates a pulse train having a constant pulse repetition frequency that is sufficiently high to disable the lidar speed monitor as discussed above. The pulse generator 44 transmits the pulse train to a laser transmitter 46 after activation by the timing pulse from the timer 36 via the motion detector gate 40. The pulse train transmitted by the pulse generator 44 causes the laser transmitter 46 to transmit the jamming laser beam to the lidar speed monitor as discussed above. It will be appreciated that the laser transmitter 46 is used rather than a light emitting diode (LED) because current LEDs do not generate light beams of sufficient power or spectral purity to disable the lidar speed monitor. A lens 47 may be positioned in front of the laser transmitter 46 and in the path of the jamming laser beam. The lens 47 is structured to cause a jamming laser beam to diverge a predetermined amount sufficient to direct the jamming laser beam at the lidar speed monitor with sufficient power to reach the lidar speed monitor.

The laser transponder 28 includes a fault detector 48 coupled to the laser transmitter 46. The fault detector 48 checks for an overcurrent condition that could result from a fault in the laser transponder circuitry allowing the laser 42 to transmit the jamming laser beam longer than desired. When such an overcurrent condition occurs, the fault detector 48 causes a fault alert device 50 to alert the motor vehicle driver with a visual and/or audible warning. In addition, the fault detector 48 closes a power gate 52 which disconnects a power supply 54 from the laser transmitter 46 and thereby turns off the laser transmitter 46. The speed warning device 38 and the fault alert device 50 are at least in part mounted within the motor vehicle on a display panel 53.

Figure 5A:
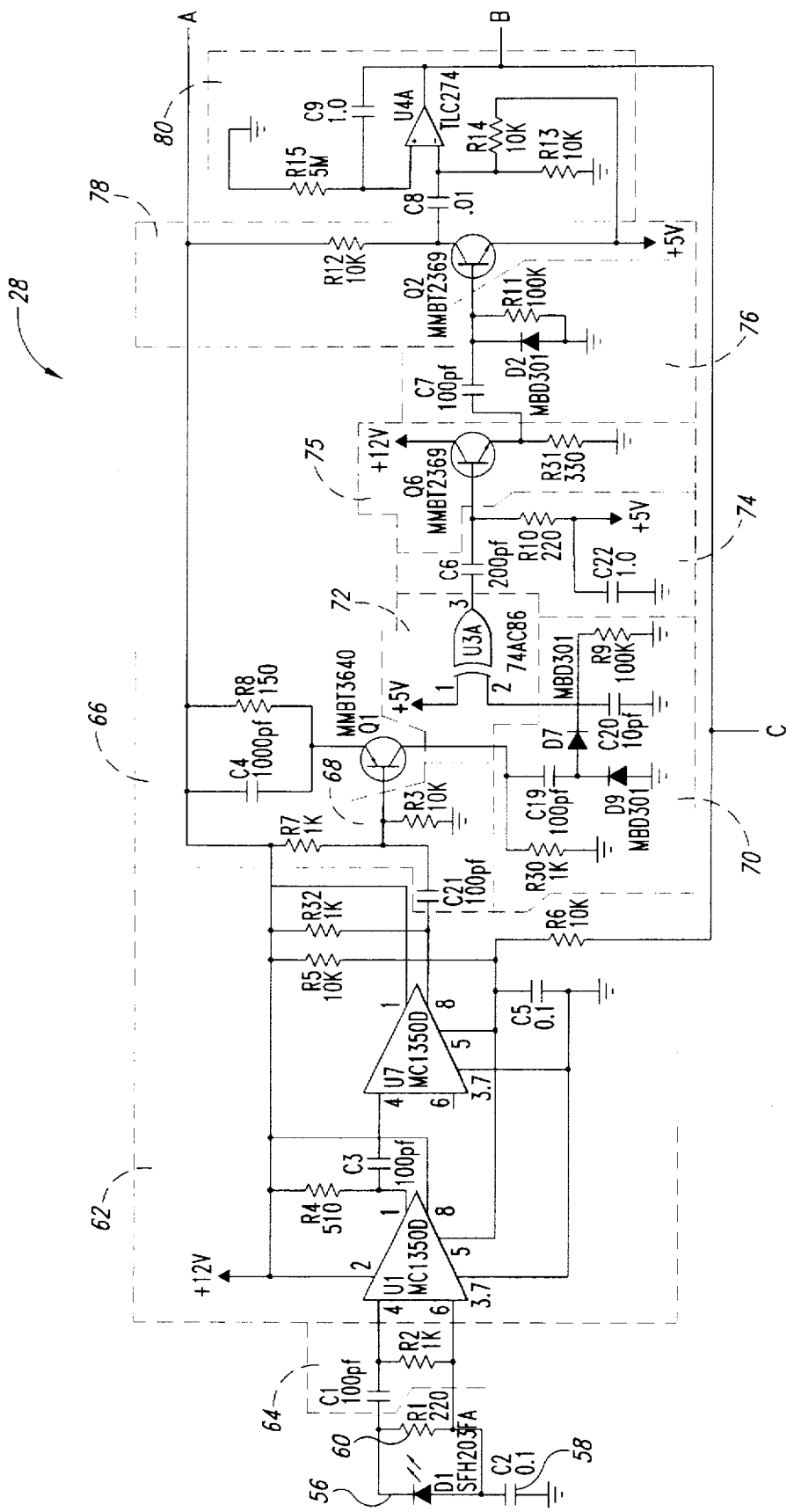
FIGS. 5A–5D together are a circuit diagram depicting a preferred embodiment of the laser transponder shown in FIG. 4.

A first embodiment of the laser transponder 28 is shown in FIGS. 5A-5D. The laser transponder 28 includes a photodiode 56 that receives an incoming laser beam (FIG. 5A). In a preferred embodiment, the photodiode 56 is a silicon photodiode, such as the SFH 203 FA by Siemens. The Siemens photodiode includes a 200 nM-wide spectral filter centered on a wavelength of 900 nM, which is close to the 905 nM wavelength typical of the monitor laser beams transmitted by current lidar speed monitors. Such a spectral filter is used to prevent background daylight from triggering the laser detector 30. The Siemens photodiode also features a built-in lens 31 (FIG. 4) with a relatively narrow (20°) optical acceptance angle in order to maximize the monitor laser beam signal received by the laser detector 30.

The photodiode 56 is connected to ground via a capacitor 58 and is also connected in parallel with a load resistor 60. The incoming laser beam causes the photodiode to develop a laser detection signal across the load resistor 60. The laser detector signal on the load resistor 60 is provided to a high frequency Motorola MC1350 amplifier circuit 62 via a high pass filter 64. The high frequency amplifier circuit 62 has a 30-50 MHz bandwidth which, in combination with the high pass filter 64, optimizes the signal-to-noise ratio of the laser detection signal for a signal that arises from a 15 nanosecond pulse in the incoming laser beam. Thus, the amplifier circuit 62 and the high pass filter 64 together comprise a matched filter. In addition, the amplifier circuit 62 includes AGC inputs that turn off the amplifier circuit 62, and thus, implement the gate 32 shown in FIG. 4.

The amplified laser detection signal output by the high frequency amplifier circuit 62 is transmitted to a PNP transistor circuit 66 via an RC network 68. The PNP transistor circuit 66 is coupled to a diode rectifier circuit 70. The PNP transistor circuit 66, RC circuit 68 and diode rectifier 70 stretch the narrow, 15 nanosecond pulse of the amplified laser detection signal output by the amplifier circuit 62 to a signal pulse over 500 microseconds in width. A CMOS inverter 72 connected to the diode rectifier circuit 70 is triggered by the 500 microsecond signal pulse. The CMOS inverter 72 inverts the 500 microsecond signal pulse and outputs the inverted 500 microsecond signal pulse to an RC circuit 74. The RC circuit 74 differentiates the pulse to produce negative and positive signal pulses. The negative and positive signal pulses are passed to an emitter follower circuit 75 which amplifies the current of the signal pulses. A diode rectifier 76 adds both negative and positive signal pulses together to generate a signal pulse having a pulse height in excess of 5 volts if the negative and positive signal pulses are closely spaced. The 5 volt signal pulse triggers an NPN transistor circuit 78 biased with 5 volts on the emitter terminal of the NPN transistor used in the circuit.

Together the PNP transistor circuit 66, RC circuit 68, diode rectifier circuit 70, CMOS inverter 72, RC circuit 74, diode rectifier 76 and NPN transistor circuit 78 constitute a preferred embodiment of the pulse discriminator 34 shown in FIG. 4. The diode rectifier 76 discharges relatively slowly such that a long pulse does not trigger the NPN transistor circuit 78. Such a long pulse would be generated if the incoming laser beam included a pulse train with a high pulse repetition frequency, such as the 2 MHz pulse train transmitted by the laser 42 of another laser transponder of the preferred embodiment shown in FIG. 4. As a result, the pulse discriminator 34 implemented by the circuit elements 66–78 outputs a signal only if the incoming laser beam detected by the diode laser 56 has a pulse repetition frequency similar to the pulse repetition frequency of a typical lidar speed monitor.

Coupled to the NPN transistor circuit 78 is a one shot timer 80 that transmits a 5 second timing pulse when activated by the signal output by the NPN transistor circuit 78 (FIG. 5A). The timing pulse transmitted by the one shot timer 80 is transmitted to the AGC inputs of the high frequency amplifier circuit 62 which disconnects the photodiode 56 from the pulse discriminator 34 implemented by circuit elements 66–78. In addition, the timing pulse from the one shot timer 80 is transmitted to a piezo alarm 82 (FIG. 5C) which outputs an audible alarm to the user. The audible alarm output by the piezo alarm 82 indicates to the motor vehicle driver that a monitor laser beam transmitted by the lidar speed monitor has been detected.

Figure 5B:
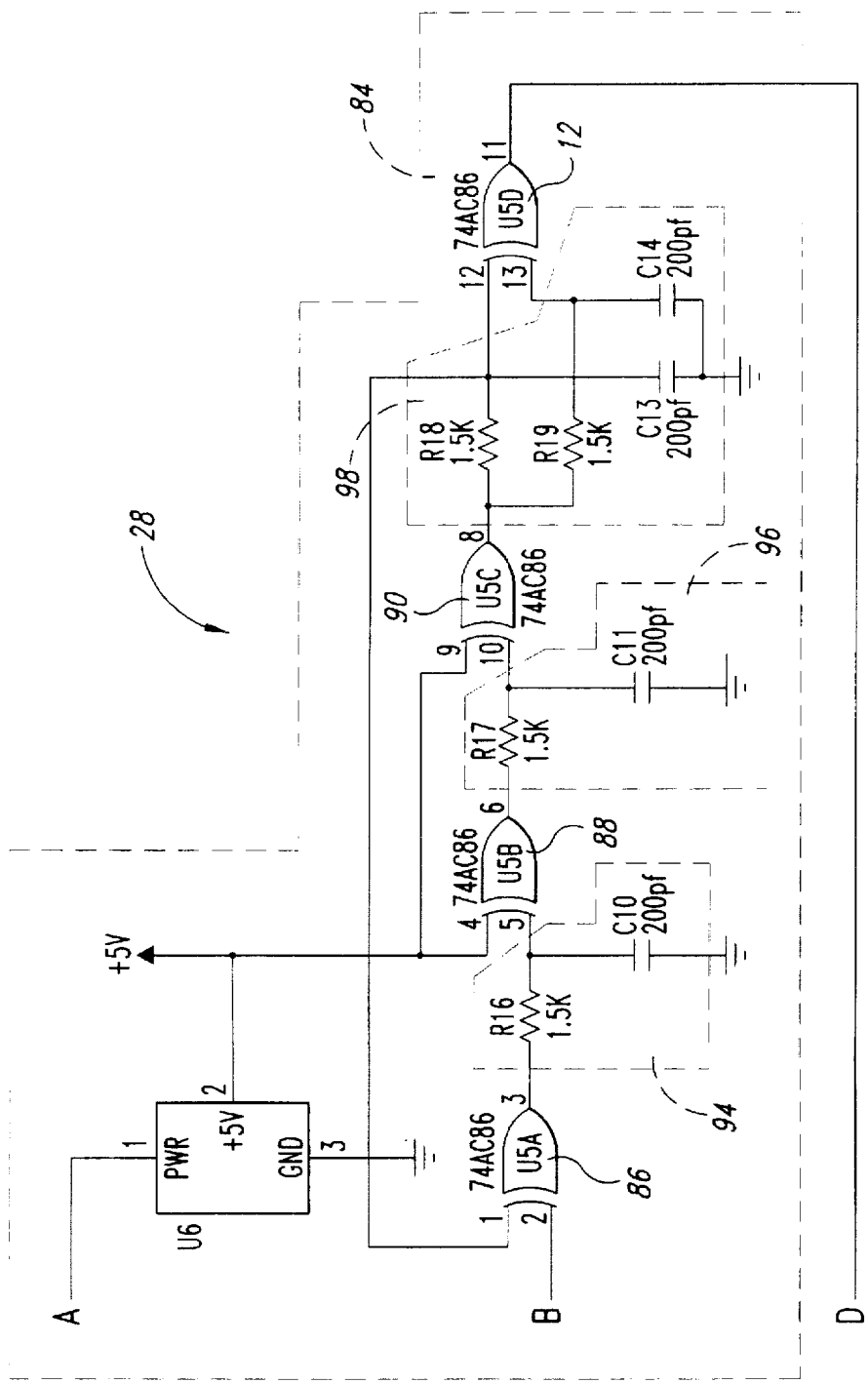

The timing pulse transmitted by the one shot timer 80 also is received by a pulse generator 84 shown in FIG. 5B. The pulse generator outputs 15 nanosecond pulses that are spaced 500 nanoseconds apart which results in a pulse train having a pulse repetition frequency of 2 MHz. The pulse generator 84 includes first, second, third, and fourth CMOS inverters 86, 88, 90, 92, respectively. First, second and third RC circuits 94, 96, 98, respectively, are positioned between the CMOS inverters 86, 88, 90, 92. Together the CMOS inverters 89–92 and RC circuits 94–98 of the pulse generator 84 form a 2 MHz oscillator. The third RC circuit 98 provides a differential delay in the input of the fourth CMOS inverter 92 which creates a single positive output pulse whose width is established by the mismatch between the third RC circuit 98 and the first and second RC circuits 94, 96.

Figure 5C:
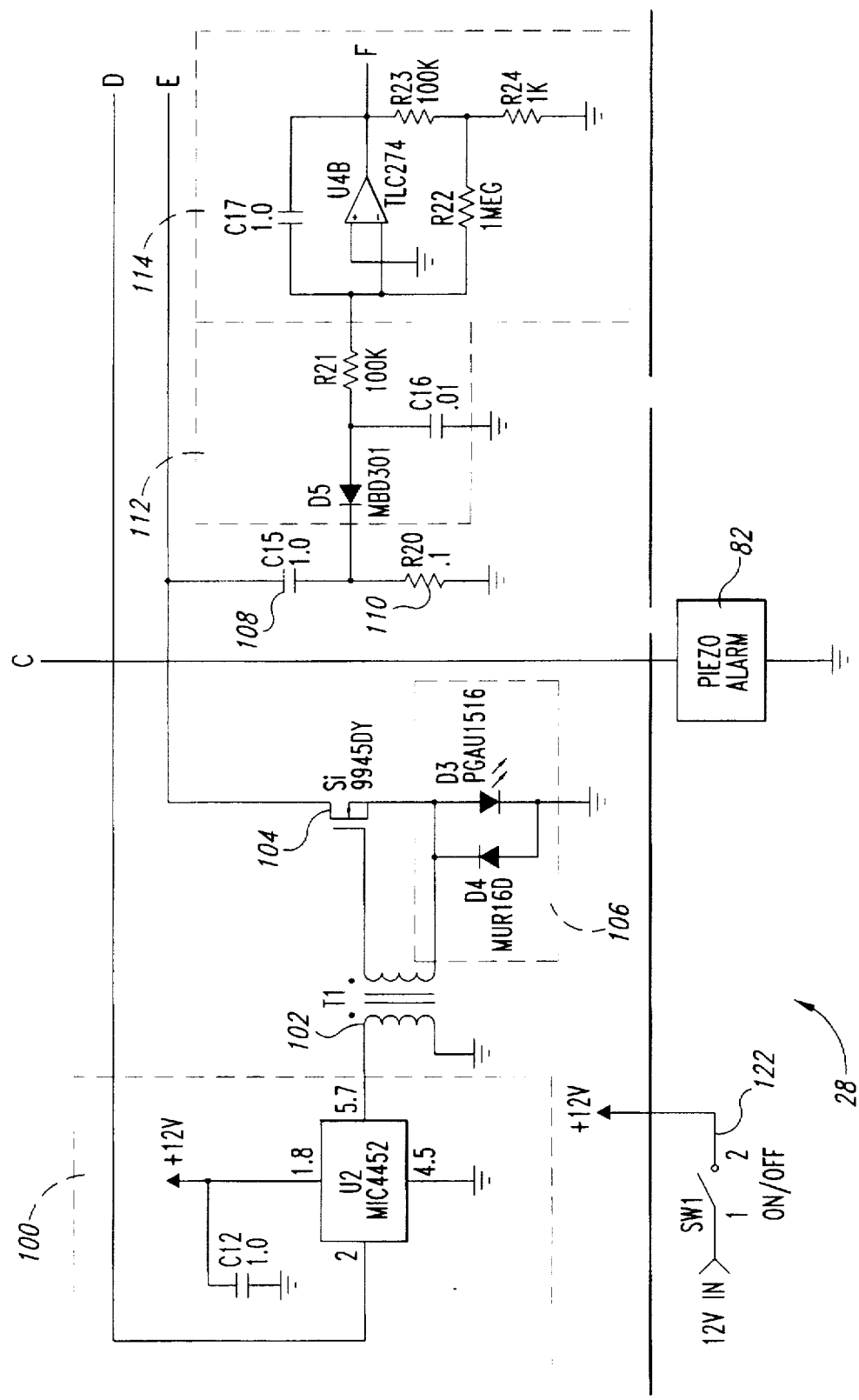

The pulse train produced by the pulse generator 84 is transmitted to a power MOSFET driver circuit 100 shown in FIG. 5C. The power MOSFET driver circuit 100 amplifies the pulse train received from the pulse generator 84. The power MOSFET driver circuit 100 drives a pulse transformer 102 and a high current, N-channel MOSFET switch 104. The pulse transformer 102 outputs a transformed pulse train to the MOSFET switch 104. The MOSFET switch 104 transmits 15 amp current pulses to a diode laser 106 when the transformed pulse train closes the MOSFET switch 104. The diode laser 106 is implemented in the preferred embodiment by a galium arsenide laser sold by EG&G Optoelectronics under the name PGAUIS16. In response to the pulses from the MOSFET switch 104, the diode laser transmits the jamming laser beam with the desired 2 MHz pulse train. The pulse transformer 102 is used instead of a direct drive in order to keep the cathode (case) of the diode laser 106 at ground potential.

It should be noted that diode lasers, such as the diode laser 106, are not characterized by the manufacturer to operate at the 1–2 Mhz pulse frequency of the jamming laser beam. We have found experimentally that for the short operating time used to transmit the jamming laser beam (5–10 seconds), adequate diode laser life can be obtained. The short operating time also eliminates elaborate heat sinking of the power devices of the laser transponder 28. As a result, it is possible to construct an inexpensive laser transponder 28 having a cost of not more than a few hundred dollars.

As discussed above with respect to FIG. 4, the laser transducer 28 includes the fault detector 48 that detects when an overcurrent condition occurs and disconnects the laser 42 from the power supply 50. In the preferred embodiment shown in FIGS. 5C and 5D, the fault detector 48 includes a capacitor 108 that provides energy for the pulse train transmitted to the diode laser 106 by the MOSFET switch 104 (see FIG. 5C). The capacitor 108 should have a low inductance and high current handling capabilities. The capacitor 108 can be constructed by paralleling many smaller capacitors in order to share current and thereby increase the current handling capabilities of the capacitor 108. A resistor 110 coupled to the capacitor 108 receives pulse current from the capacitor 108 and negative pulses are generated. A diode rectifier circuit 112 connected to the resistor 110 rectifies the negative pulses from the resistor 110. The diode rectifier circuit 112 is connected to an integrator circuit 114 which receives the rectified pulses from the diode rectifier circuit. Coupled to the integrator circuit 114 is a threshold/latch circuit 116 (see FIG. 5D) that is triggered by the output from the integrator circuit 114 if that output is greater than 5 volts. The output from the integrator circuit 114 will be sufficient to trigger the threshold/latch circuit 116 if the pulse train that triggers the diode laser 106 exceeds a predetermined time, such as 10 seconds. In addition, the integrator circuit 114 will also trigger the threshold/latch circuit 116 if the diode laser 106 is frequently retriggered by successive pulse trains. The threshold/latch circuit 116 is coupled to a P-channel MOSFET switch circuit 118 of FIG. 5D that shuts off when the threshold/latch circuit 116 is triggered into producing a high output signal. When the P-channel MOSFET switch circuit 118 shuts off, then the power to the N-channel MOSFET switch circuit 104 is disconnected, which turns off the diode laser 106. As a result, circuit elements 108–118 together implement a preferred embodiment of the fault detector 48 shown in FIG. 4.

Figure 5D:
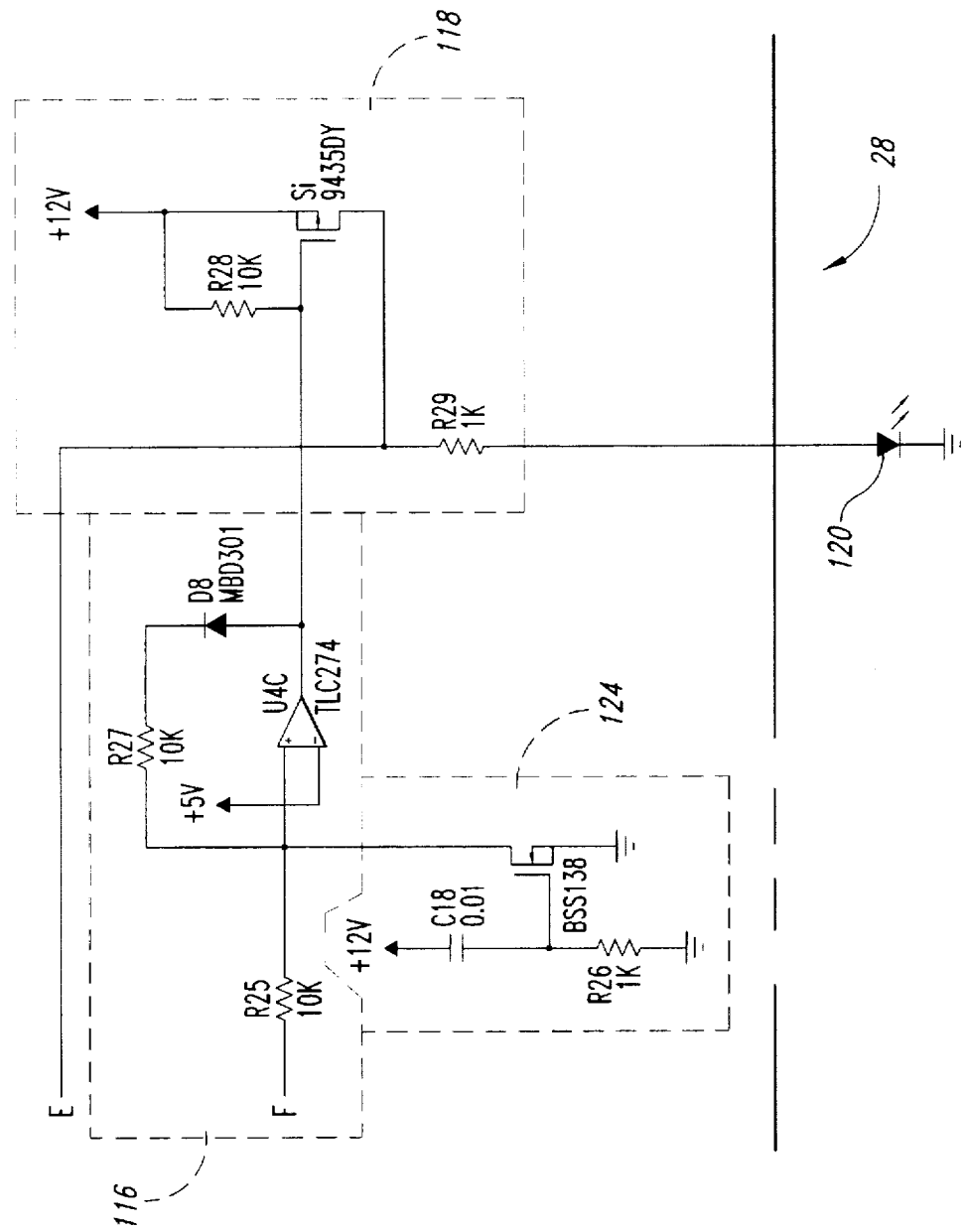

The P-channel MOSFET switch circuit 118 is coupled to an LED warning light 120. Under normal operating conditions, the P-channel MOSFET switch circuit 118 provides power to the LED warning light 120, which lights up to indicate that the laser transducer 28 is operating normally. When an overcurrent condition occurs, the shut off of the P-channel MOSFET switch circuit 118 removes power from the LED warning light 120, thereby indicating to the driver that an over current condition has occurred and the diode laser 106 has been turned off. As a result, the shut off of the P-channel MOSFET switch circuit 118 will prevent thermal damage to the semiconductor devices of the laser transducer 28 which are not rated for continuous duty in the embodiment shown in FIGS. 5A–5D. In addition, the shut off of the P-channel MOSFET switch circuit 118 will also prevent inadvertent eye exposure in the event of the over current condition. To reset the laser transducer 28, the motor vehicle driver can activate a power switch 122 (FIG. 5C) which triggers a pull down n-channel FET transistor circuit 124 (FIG. 5D). The pull down transistor circuit 122 returns the output of the integrator 116 to a low level which opens the P-channel MOSFET switch circuit 118 and returns the laser transducer 28 to normal operation.

The simplicity of the laser transducer 28 enables the laser transducer to be implemented in a housing (not shown) that can mount on a typical license frame of a motor vehicle. A housing dimension of 6 inch by 1 inch by ½ inch or less is feasible. The housing preferably is made from metal so that the housing can act as a heat sink for the diode laser 106.

It will be appreciated that the laser transducer 28 shown in FIGS. 4 and 5A–5D and the method shown in FIG. 3 enable a lidar speed monitor to be disabled for a sufficient period of time that enables a motor vehicle driver to reduce the speed of the motor vehicle in a safe manner. The laser transducer includes numerous safety features that prevent inadvertent exposure to the jamming laser beam transmitted by the laser transducer. In addition, the laser transducer and method can be implemented in a relatively simple circuit that does not require the pulse repetition frequency of the lidar speed monitor to be analyzed and matched. In addition, the laser transducer disables the lidar speed monitor regardless of whether the pulse repetition rate of the monitor laser beam transmitted by the lidar speed monitor is constant, unstable, random, or programmed.

Figure 6:
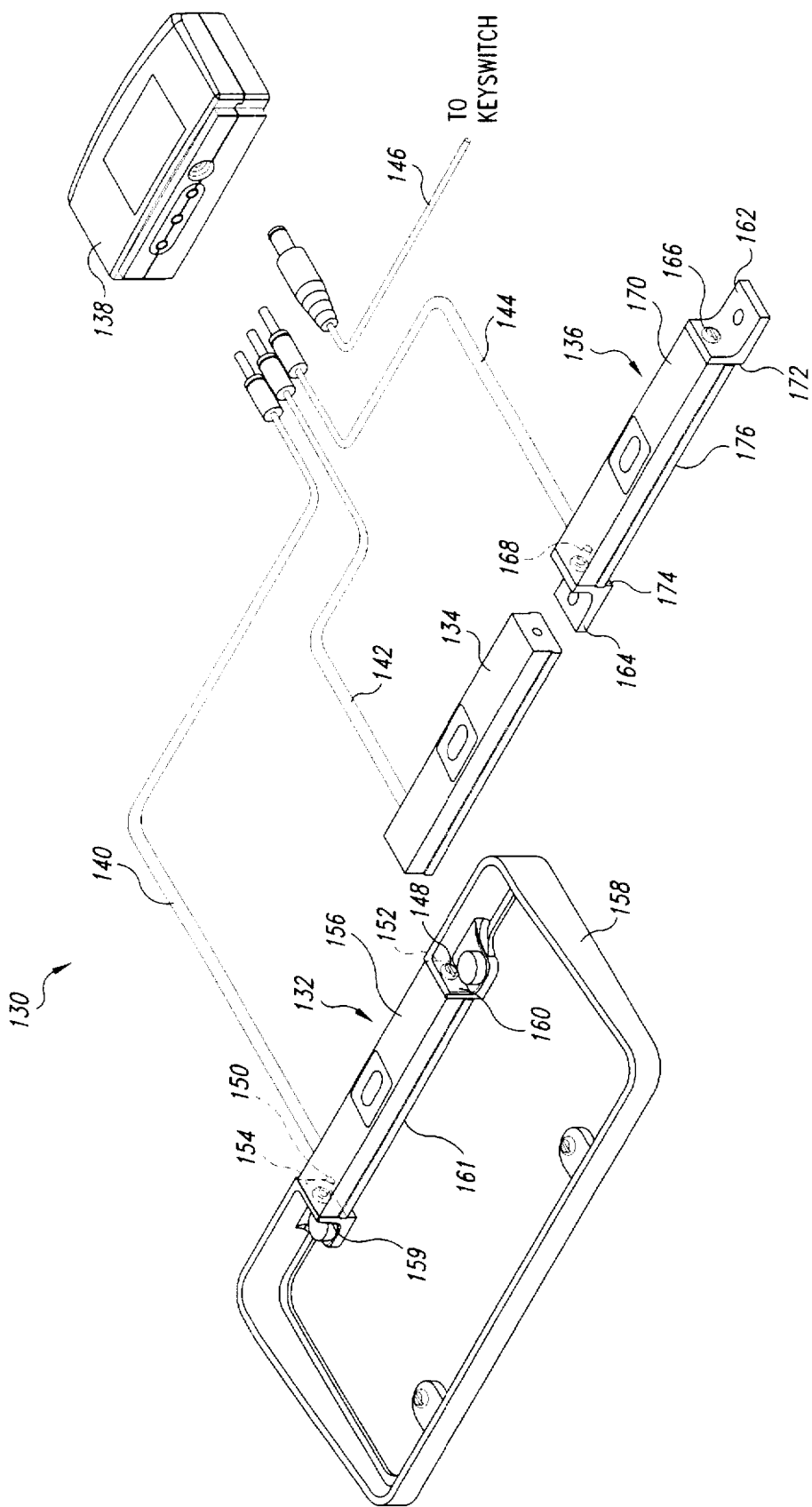
FIG. 6 is an isometric view of a lidar speed monitor disabling system according to the present invention.

A preferred embodiment of a lidar speed monitor disabling system 130 is shown in FIG. 6. The disabling system 130 includes first, second and third laser transponders 132, 134 and 136 that each connect to an annunciator 138. Each of the laser transponders 132–136 is intended to be positioned on the outside of the motor vehicle at a location at which the monitor laser beam would likely be directed from the lidar speed monitor. In contrast, the annunciator 138 is intended to be positioned inside of the vehicle at a location in which the vehicle driver can see and hear the annunciator 138. The annunciator 138 preferably includes a display panel, such as the display panel 53 shown in FIG. 4, that provides a visual and/or audible warning to the vehicle driver whenever any of the laser transponders 132–136 detects a monitor laser beam transmitted by a lidar speed monitor.

In addition to providing the vehicle driver with warnings of monitor laser beams being directed from lidar speed monitors to the vehicle, the annunciator 138 supplies power to the first, second and third laser transponders 132, 134 and 136 via first, second and third connection lines 140, 142 and 144, respectively. A power line 146 supplies the annunciator 138 with power from a conventional vehicle battery (not shown) via the ignition key switch (not shown) of the vehicle. The annunciator 138 and the laser transponders 132–136 are supplied with power from the vehicle battery via the ignition key switch to ensure that the laser transponders do not transmit any jamming laser beams unless the vehicle is turned on.

Because of the limited cross section of a typical monitor laser beam (two foot cross-sectional radius at 1,000 feet from the lidar speed monitor), it is important that the laser transponders 132–136 (or more if necessary) be positioned on the vehicle so that the monitor laser beam can be detected regardless of the portion of the vehicle at which the monitor laser beam is being directed. Accordingly, it is important that each of the laser transponders 132–136 be equipped with a connection system that allows secure attachment of the laser transponder to the vehicle at a desired location. In addition, each of the laser transponders 132–136 should be oriented so that the laser detector 30 and the laser transmitter 46 of the laser transponder face toward the lidar speed monitor. The preferred orientation of each of the laser transponders 132–136 will be parallel to the ground to ensure that laser transmitter transmits the jamming laser beam at the approximate height of a car which typically employs the lidar speed monitor.

The first laser transponder 132 accomplishes the desired objectives by including first and second connectors 148 and 150 on opposite first and second ends 152 and 154, respectively, of a transponder housing 156. The transponder connectors 148, 150 enable the laser transponder 132 to be securely affixed to a compatible vehicle license plate cover 158 that is connected along with the license plate to the vehicle. Being able to connect the first laser transponder 132 to the vehicle adjacent the vehicle license plate is particularly important because, as discussed above, the monitor laser beam from a lidar speed monitor typically is directed at the vehicle license plate because of its retro-reflective paint. Preferably, the housing 156 of the first laser transponder 132 is painted the same color as the license plate cover 158 in order to enable the laser transponder 132 to blend in with the license plate cover 158 and thereby avoid theft of the laser transponder.

In addition, the first and second transponder connectors 148, 150 are structured to enable the angular orientation of the first laser transponder 132 to be adjusted as necessary by a user of the vehicle to direct the laser transponder at the lidar speed monitor. After the license plate cover 158 is mounted on the vehicle license plate, the vehicle user can loosen the first and second transponder connectors 148, 150 and pivot the first laser transponder 132 about a line extending between the transponder connectors to a desired angular orientation. The license plate cover 158 has first and second sidewalls 159, 160 that project forward from a back wall 161 of the housing 156 extending between the first and second sidewalls. The forward projection of the first and second sidewalls 159, 160 from the back wall 161 enables the first laser transponder 132 to pivot on the transponder connectors 148, 150 as desired by the user. Each of the first and second sidewalls 159, 160 of the license plate cover 158 has an opening therein rotatably receiving the corresponding one of the transponder connectors 148,150. Structuring the first laser transponder 132 so that a vehicle user can adjust the orientation of the first laser transponder 132 is advantageous because of the variability in which vehicle license plates and vehicle license plate covers are oriented with respect to the motor vehicles when attached to the vehicle. The user can employ a small liquid level (not shown) to indicate when the user has pivoted the first laser transponder 132 on the transponder connectors 148, 150 sufficiently to ensure that the laser transponder is horizontally level as required to achieve the desired angular orientation. After obtaining the desired angular orientation, the transponder connectors 148, 150 can be tightened to securely affix the first laser transponder 132 to the license plate cover 150 in the desired orientation.

Another advantage of employing the transponder connectors 148, 150 on opposite ends 152, 154 of the transponder housing 156, is that the first laser transponder 132 can be mounted at various locations on the vehicle without diminishing the adjustability of the laser transponder orientation.

The third laser transponder 136 is structured similarly to the first laser transponder 132, but also includes first and second mounting brackets 162, 164 that enable the third laser transponder 136 to be attached to the vehicle at locations other than the license plate cover 158. The third laser transponder 136 includes first and second connectors 166, 168 substantially identical to the transponder connectors 148, 150 of the first laser transponder 132 which are rotatably received in corresponding openings in the mounting brackets 162, 164. The first and second transponder connectors 166, 168 of the third laser transponder 136 serve to adjustably attach a housing 170 of the third laser transponder 136 to the first and second angled brackets 162, 164, respectively. The mounting brackets 162, 164 can be attached to various surfaces of the vehicle, such as its radiator grill, bumper, and hood in order to affix the third laser transponder 136 to the vehicle and adjust the angular orientation of the third laser transponder 136 as desired. Preferably, the mounting brackets 162, 164 include sidewalls 172, 174 that project forward from a back wall 176 of the housing 170 in order to allow the third laser transponder 136 to pivot on the transponder connectors 166, 168, much as described above for the housing 156 and the first laser transponder 132. It will be appreciated that any of the laser transponders 132–136 can be equipped with various connection systems that securely affix the laser transponder to the vehicle while allowing its adjustable angular orientation.

Figure 7:
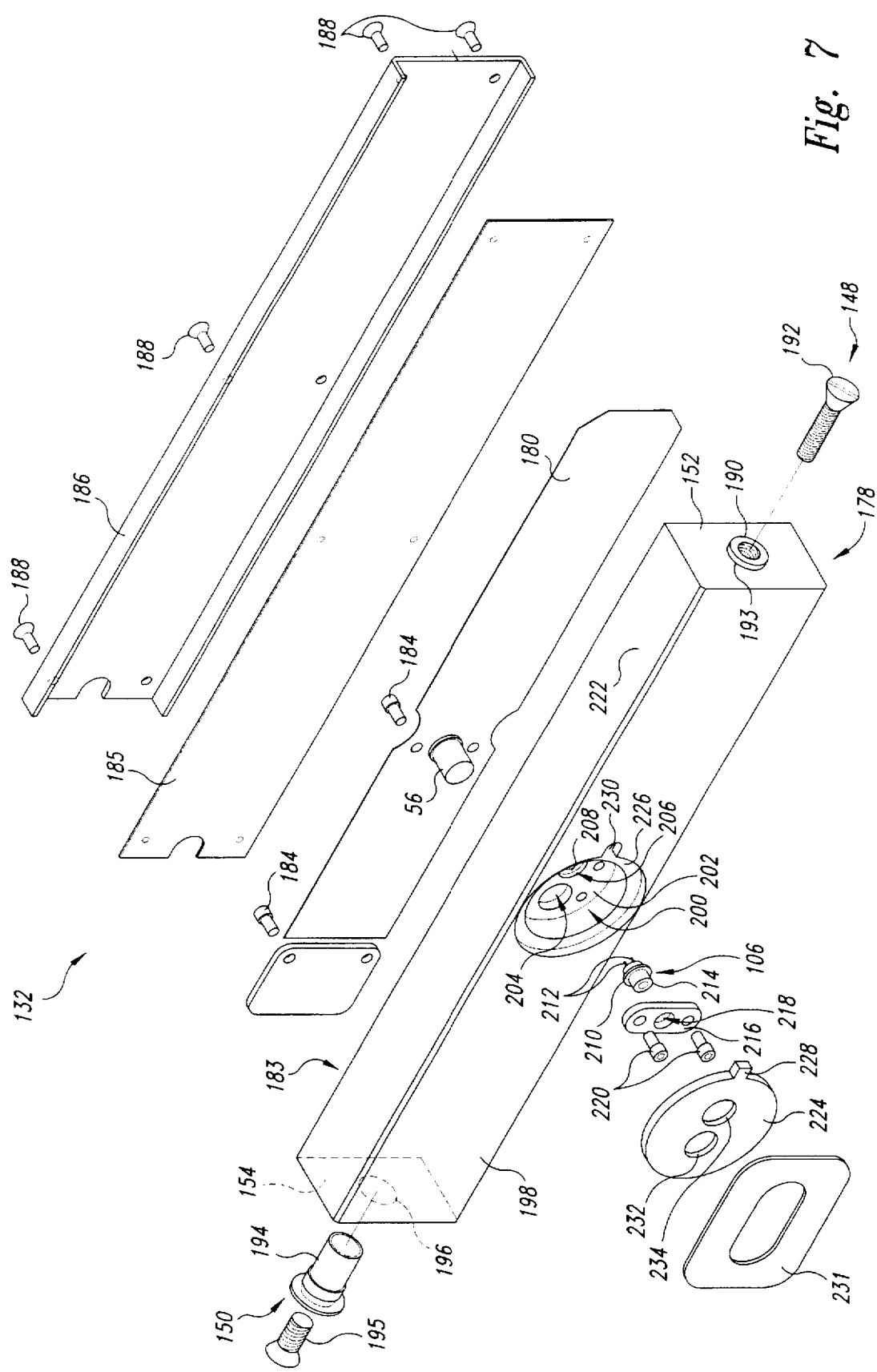
FIG. 7 is an exploded isometric front view of a laser transponder of the disabling system shown in FIG. 6.
Figure 8:
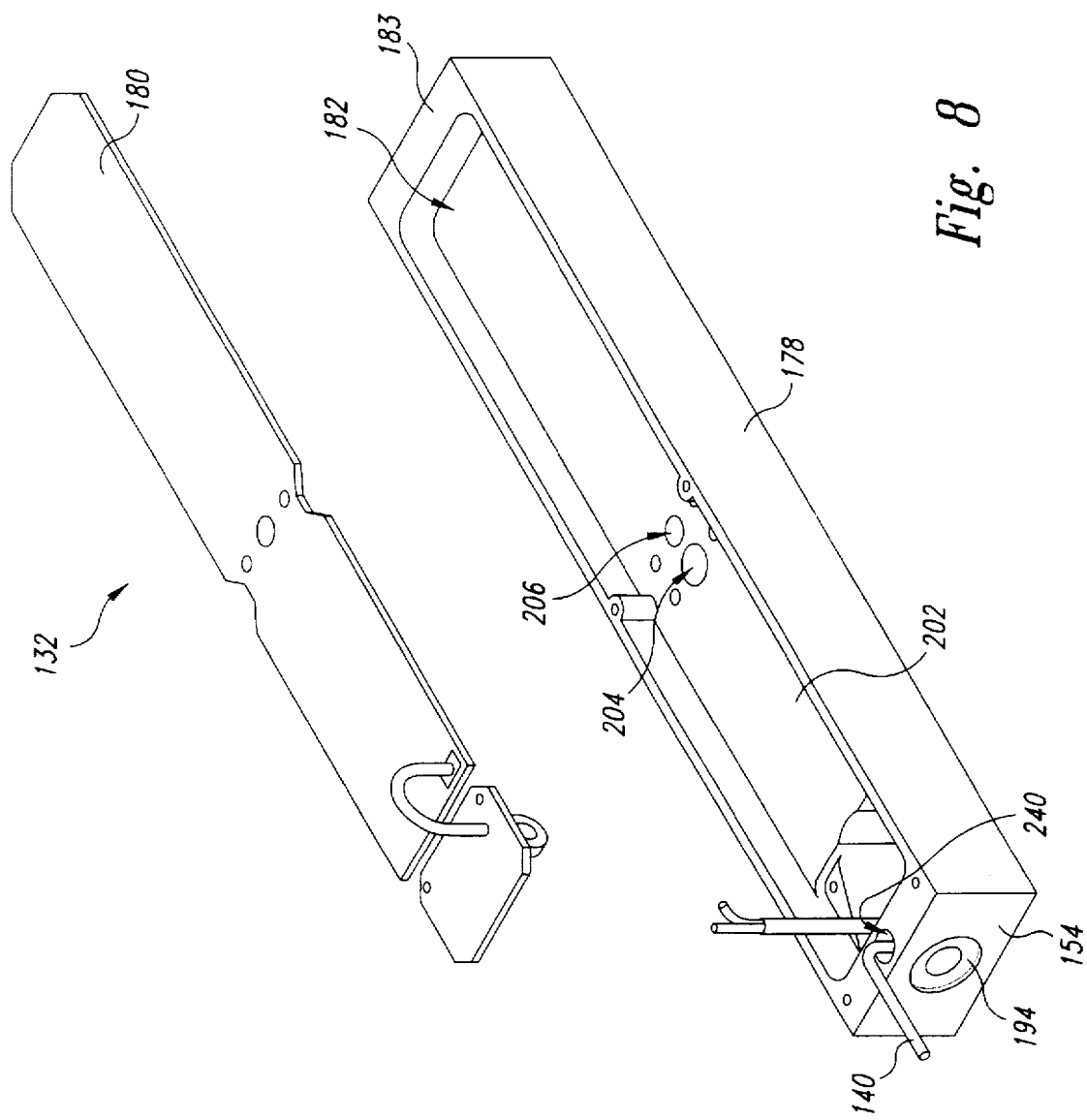
FIG. 8 is an exploded isometric rear view of the laser transponder shown in FIG. 7.

An exploded isometric front view of the first laser transponder 132 is shown in FIG. 7. The laser housing 156 of the first laser transponder 132 includes a main body 178 having the opposite first and second sides 152, 154 discussed above. A circuit board 180 fits into an appropriately shaped rear compartment or cavity 182 in a rear side 183 of the main body 178 as best shown in FIG. 8. The circuit board 180 preferably includes all of the elements of the laser transponder circuit shown in FIGS. 5A–5D, including the photodetector 56, except for the piezo alarm 82, LED warning light 120, and power switch 122 which are part of the annunciator 138. The circuit board 180 is attached within the cavity 182 to the main body 178 by a set of screws 184.

After the circuit board 180 is attached to the main body 178, a flat gasket 185 is placed in a back cover 186, and the gasket and back cover combination is placed on the rear side 183 of the main body 178. The back cover 186 has a U-shaped cross-section that is sized to hold the back cover securely in place on the main body 178. Connecting screws 188 are employed to secure the back cover 186 to the rear side 183 of the main body 178 with the gasket 184 therebetween to provide a waterproof sealed enclosure for the circuit board 180. The gasket 184 and back cover 185 can be removed to allow access to the circuit board 180 for repairing or replacing the elements of the circuit board 180. The gasket 185 preferably is made from a silicon material and provides a primary seal for the first laser transponder 132. In addition, the entire rear cavity 182 can be filled with commercially available silicon gel to provide additional environmental protection. Such silicon gel allows the elements of the circuit board 180 to be probed and repaired as needed.

The first and second transponder connectors 148, 150 are coupled to the main body 178 of the first laser transponder 132. The first transponder connector 148 includes a threaded socket 190 and a screw 192 that screws into the socket 190. The socket 190 can be formed by sealing a RIVNUT into an aperture 193 in the first end 152 of the main body 178. The second transponder connector 150 similarly includes a threaded socket 194 and a screw 195 that screws into the socket 194. The socket 194 of the second transponder connector 150 is shown as a RIVNUT that is securely fitted in an aperture 196 in the second end 154 of the main body 178. Preferably, the sockets 190 and 194 are fixed in place within the main body 178 in order to prevent rotation of the main body 178 with respect to the first and second connectors 148, 150 when the laser transponder 132 is affixed to the vehicle and the screws 192 and 195 tightened into the sockets.

A front side 198 of the main body 178 has an aperture 200 through which the photodiode 56 receives the incoming monitor laser beam and the diode laser 106 transmits the jamming laser beam. A separator wall 202 separates the rear cavity 182 (FIG. 8) of the main body 178 from the front side aperture 200. The separator wall 202 includes a detector orifice 204 through which the photodiode 56 extends from the circuit board 180 into the front side aperture 200. In addition, a transmitter orifice 206 in the separator wall 202 through which the diode laser 106 extends from the circuit board 180 into the front side aperture 200. The transmitter orifice 206 has an inner diameter immediately adjacent the rear cavity 182 that is smaller than an inner diameter of the transmitter orifice immediately adjacent the front side aperture 200 to define an annular support shoulder 208. The diode laser 106 has an annular flange 210 that abuts the annular support shoulder 208 when the diode laser is inserted into the transmitter orifice 206 from the front side 198 of the main body 178. The diode laser 106 also includes electrical leads 212 that extend through the smaller inner diameter portion of the transmitter orifice 206 to enable the diode laser 106 to be electrically connected to the circuit board 180. When the diode laser 106 is completely in place within the transmitter orifice 206, a front side of its annular flange 210 is substantially flush with the front side of the separator wall 202 and a cylindrical front portion 214 of the diode laser extends from the separator wall 202 into the front side aperture 200.

The diode laser 106 is securely held in place within the transmitter orifice 206 by a clamp 216 having a circular orifice 218 that fits securely on the cylindrical front portion 214 of the diode laser 106 and abuts the annular flange 210. A pair of screws 220 extend through the clamp 216 and are threadably received in the separator wall 202 in order to hold the clamp firmly against the separator wall 202 and the annular flange 210 of the diode laser 106. Preferably, the main body 178, including the separator wall 202, is made of metal to provide structural strength and good heat conduction. The direct connection of the diode laser 106 to the separator wall 202 of the metal main body 178 enables the main body 178 to act as a heat sink for the diode laser 106 and thereby eliminate the need for a separate head sink attached to the diode laser. It is important to limit the imperfections in the separator wall 202, annular support shoulder 208, annular flange 210, and the clamp 216 in order to ensure that the diode laser is securely oriented to transmit the jamming laser beam parallel to a top side 222 of the main body 178 and perpendicular to the front side 198 of the main body. Such a parallel orientation of the diode laser 106 enables the user to accurately direct the jamming laser beam from the diode laser simply by pivoting the main body 178 on the first and second transducer connectors 148, 150 as described above.

After the diode laser 106 is securely attached to the separator wall 202 of the main body 178, a window 224 is placed in a generally annular recess 226 that forms an expanded opening of the front side aperture 200. The window 224 includes a tab 228 that fits into a corresponding groove 230 of the recess 226 in order to prevent the window from rotating in the recess 226. Preferably, the window 224 is made of a dark, infrared-transmitting material such as polycarbonate or acrylic in order to enable the monitor laser beam to be received through the window and the jamming laser beam to be transmitted through the window. A label 231 is placed on the window 224 to provide a warning of the diode laser 106.

The window 224 includes an integral detector lens 232 and an integral transmitter lens 234 positioned in front of the photodiode 56 and the diode laser 106, respectively. The detector and transmitter lenses 232, 234 can be made by diamond turning for prototypes or can be inexpensively molded for mass production. The window 224 should be positioned very closely to the photodiode 56 and the diode laser 106 in order to allow both the detector lens 232 and the transmitter lens 234 to be parts of the same window 224 without requiring the window 224 to be excessively large.

The detector lens 232 is selected to increase the sensitivity of the photodiode 56 while the transmitter lens 234 is selected to increase the angular power density of the jamming laser beam transmitted by the diode laser 106. In a preferred embodiment, the detector lens 232 is structured to have an optical power of 2, which increases the sensitivity of the photodiode 56 by a factor of 4 and reduces the beam width of the incoming monitor laser beam from plus or minus 20° to plus or minus 10°. The transmitter lens 234 preferably is a landscape lens having a vertical power of 1.5 and a horizontal power of 2.6. The diode laser 106 transmits the jamming laser beam with a vertical beam spread of 10° and a horizontal beam spread of 25° which is altered by the transmitter lens 234 to a vertical beam spread of 6.6° and a horizontal beam spread of 9.6°. Such values have been found to enable the first laser transponder 132 to detect and jam lidar speed monitors on either side of the road in front of the vehicle as well as on highway overpasses at distances of 1000 feet or more.

It is well known that typical diode lasers, such as the diode laser 106, suffer from manufacturing tolerances that cause the laser beams transmitted from such diode lasers to be offset slightly. Although the inaccuracies caused by such laser beam offsets can be minimized by employing a diode laser with a larger beam spread, such wider laser beams inherently are of less power. The present invention overcomes the beam offset caused by the manufacturing tolerances of the diode laser 106 by adjusting the position of the transmitter lens 234 rather than attempt to re-adjust the orientation of the diode laser. The position of the transmitter lens 234 is selected so that the laser beam output from the first laser transponder 132 is directed parallel to or coincident with the optical axis of the transmitter lens 234. If the laser beam offset is a lateral displacement of the laser beam with respect to the location at which the laser beam is intended to be transmitted by the diode laser 106, then the transmitter lens 234 is positioned to match the lateral displacement of the laser beam such that the laser beam substantially coincides with the optical axis of the transmitter lens 234. If the laser beam offset is an angular displacement, that is, the laser beam transmitted by the diode laser 106 is not perpendicular to the front side 198 of the first laser transponder 132, then the transmitter lens 234 is positioned so that the laser beam intersects the transmitter lens substantially at the optical axis of the transmitter lens 234. Preferably, the transmitter lens 234 is not a perfect collimating lens so that the laser beam is redirected along the optical axis of the transmitter lens 234. Preferably, the optical axis of the transmitter lens 234 is parallel to the first and second ends 152, 154 of the main body 178 (and parallel to the top side 222 of the main body) so that the transmitter lens directs the jamming laser beam perpendicular to the front side 198 of the main body 178.

The precise positioning of the transmitter lens 234 can be accomplished by securely attaching the diode laser 106 to the main body 178 and directing a laser beam from the diode laser through the transmitter lens 234 at a target directly in front of the diode laser. If the laser beam misses the target, then the transmitter lens 234 can be moved laterally by moving the entire window 224 as necessary to cause the laser beam to hit the target. When the laser beam hits the target, then the window 224 can be sealed in place to the main body 178 by a bonding agent. Of course, the recess 226 should be somewhat larger than the window 224 to accommodate the minor lateral movements needed to enable the transmitter lens 234 to compensate for the jamming laser beam offset.

It will be appreciated that because the detector lens 232 and the transmitter lens 234 are both part of the same window 224, the lateral adjustment of the window 224 to remove beam offsets in the laser beam transmitted by the diode laser 106 will cause the detector lens 232 to also be moved off axis with respect to the photodiode 56. However, as discussed above, the photodiode 56 has a larger collecting cone (plus or minus 10°) than the collecting cone of the diode laser 106 (6.6°by 9.6°). The larger collecting cone of the photodiode 56 enables the photodiode 56 to tolerate more pointing errors than can be tolerated by the diode laser 106.

An exploded, isometric rear view of the first laser transducer 132 is shown in FIG. 8. The rear side 183 of the main body 178 includes an undercut channel 240 that connects with the rear side cavity 182. The connecting line 140 from the annunciator 138 is inserted through the channel 240 and is electrically connected to the circuit board 180. To seal the connecting line 140 in the channel 240, the main body is stood on its second end 154 and a bonding agent, such as epoxy, is filled into the channel 240. Standing the main body 178 on the second end 154 allows the bonding agent to seal the connecting line 140 in the channel 240 without contacting the circuit board 180 or the gasket 185.

While not described in detail, the second and third laser transponders 134 and 136 have a similar construction to the first laser transponder 132 described above.

Based on the foregoing discussion and accompanying figures, it will be appreciated that the present invention provides a laser transducer that efficiently jams a lidar speed monitor sufficiently long to enable the vehicle driver to reduce the speed of the vehicle. In addition, the laser transponder includes a housing that provides both a heat sink for the laser transmitter and a structural package that is sufficiently rugged and waterproof to be positioned anywhere on the vehicle that would be subjected to a monitor laser beam from a lidar speed monitor. Also, the housing includes a connection system that enables the laser transponder to be securely attached to almost any location on the vehicle. Moreover, the connection system enables a user of the vehicle to adjust the angular orientation of the laser transponder as needed to accurately detect and jam lidar speed monitors. Further, the housing enables a window with two integrated lenses to increase the sensitivity of the laser detector while simultaneously increasing the power of the jamming laser beam transmitted by the laser transponder.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A laser transponder for disabling a laser-based speed monitor, the speed monitor being of a type that transmits a monitor laser beam at a moving vehicle, receives a reflected laser beam from the moving vehicle, and determines the speed of the moving vehicle based on the time elapsed between transmitting the monitor laser beam and receiving the reflected laser beam, the laser transponder comprising:

a laser detector structured to detect the monitor laser beam transmitted by the speed monitor at the moving vehicle and transmit a detection signal in response to detecting the monitor laser beam;

a laser transmitter configured to transmit to the speed monitor a jamming laser beam in response to the detection signal, the jamming laser beam being configured to disable the speed monitor; and a housing to which the laser detector and the laser transmitter are attached, the housing having first and second ends opposite each other on the housing, each of the first and second ends having a connector for pivotably connecting the laser transponder to the vehicle, the connectors being structured to enable the housing to pivot about a line extending through the housing between the first and second ends to angularly orient the laser detector and laser transmitter relative to the vehicle.

2. The laser transponder of claim 1 wherein each of the connectors is structured to enable the laser transponder to be disconnectable from and reconnectable to the vehicle.

3. The laser transponder of claim 1 wherein each of the connectors includes a female connection element and a male connection element that removably mates with the female connection element to enable the laser transponder to be disconnected and reconnected to the vehicle.

4. The laser transponder of claim 1 wherein the housing completely encloses the laser transmitter and is structured to shield the laser transmitter from electromagnetic interference from the vehicle.

5. The laser transponder of claim 4 wherein the housing includes a window positioned to enable the jamming laser beam to pass through the window toward the speed monitor.

6. The laser transponder of claim 5 wherein the laser detector and laser transmitter are positioned within the housing behind the window and the window includes a transmitter lens and a detector lens, the transmitter lens being positioned to enable the jamming laser beam, to pass through the transmitter lens, and the detector lens being positioned to enable the monitor laser beam to pass through the detector lens.

7. The laser transponder of claim 1 wherein the housing includes a main body and a cover releasably attached to the main body, the laser transmitter and laser detector being releasably coupled to the main body in position such that laser transmitter and laser detector can be removed from the main body and replaced when the cover is detached from the main body.

8. A laser transponder for disabling a laser-based speed monitor, the speed monitor being of a type that transmits a monitor laser beam at a moving vehicle, receives a reflected laser beam from the moving vehicle, and determines the speed of the moving vehicle based on the time elapsed between transmitting the monitor laser beam and receiving the reflected laser beam, the laser transponder comprising:

a laser detector structured to detect the monitor laser beam transmitted by the speed monitor at the moving vehicle;

a laser transmitter coupled to the laser detector, the laser transmitter being configured to transmit to the speed monitor a jamming laser beam in response to the laser detector detecting the monitor laser beam the jamming laser beam being configured to disable the speed monitor;

a metal housing with which the laser detector and laser transmitter are mounted, the laser transmitter being directly affixed to and contacting the housing so that the housing acts as a heat sink for the laser transmitter, the housing fully enclosing the laser transmitter except for an aperture through which the laser transmitter directs the jamming laser beam; and a window coupled to the housing and positioned to cover the aperture of the housing, the window being structured to allow the jamming laser beam to pass through the window.

9. The laser transponder of claim 8 wherein the housing includes an interior wall located toward a rearward end of the aperture and extending at least partially across the aperture, the laser transmitter being mounted within the aperture to the interior wall, the laser transmitter having connecting leads and the interior wall defining a passageway sized to receive the lead of the laser transmitter therethrough for coupling the laser transmitter to a circuit board located within a compartment of the housing rearward of the aperture and the interior wall.

10. The laser transponder of claim 8 wherein the housing includes a plurality of detachable connectors that enable the laser transponder to be selectively attached and detached from the vehicle.

11. The laser transponder of claim 10 wherein the connectors pivotally couple the laser transponder to the vehicle.

12. The laser transponder of claim 8 wherein the window includes a transmitter lens and a detector lens, the transmitter lens being positioned to enable the jamming laser beam to pass through the transmitter lens, and the detector lens being positioned to enable the monitor laser beam to pass through the detector lens.

13. The laser transponder of claim 12 wherein the transmitter lens is a landscape lens having an horizontal optical power along a horizontal plane and a vertical optical power along a vertical plane, the horizontal optical power being different than the vertical optical power.

14. The laser transponder of claim 8 wherein the laser transmitter transmits the jamming laser beam along a transmitter optical axis and the window includes a transmitter lens positioned along the transmitter optical axis, the transmitter lens having an optical axis that is perpendicular to a front side of the housing so that the transmitter lens directs the jamming laser beam perpendicular to the front side and substantially along the optical axis of the transmitter lens.

15. The laser transponder of claim 8 wherein the housing includes a main body and a removable cover that is releasably attached to the main body, the laser transmitter and laser detector being releasably coupled to the main body in position such that laser transmitter and laser detector can be removed from the main body and replaced when the cover is detached from the main body.

16. A laser transponder for disabling a laser-based speed monitor, the speed monitor being of a type that transmits a monitor laser beam at a moving vehicle, receives a reflected laser beam from the moving vehicle, and determines the speed of the moving vehicle based on the time elapsed between transmitting the monitor laser beam and receiving the reflected laser beam, the laser transponder comprising:

a laser detector structured to detect the monitor laser beam transmitted by the speed monitor at the moving vehicle;

a laser transmitter coupled to the laser detector, the laser transmitter being configured to transmit to the speed monitor a jamming laser beam in response to the laser detector detecting the monitor laser beam, the jamming laser beam being configured to disable the speed monitor;

a housing to which the laser detector and laser transmitter are coupled, the housing including an aperture through which the laser detector receives the monitor laser beam and through which the laser transmitter directs the jamming laser beam to the speed monitor; and a window coupled to the housing and positioned to cover the aperture of the housing, the window including a detector lens and a transmitter lens, the detector lens being positioned to allow the monitor laser beam to pass through the detector lens to the laser detector, and the transmitter lens being positioned to allow the jamming laser beam to pass through the transmitter lens from the laser transmitter to the speed monitor.

17. The laser transponder of claim 16 wherein the housing includes an interior wall positioned adjacent to the aperture and a circuit board is located within the housing rearward of the interior wall, the laser transmitter being clamped to the interior wall, the laser transmitter being connecting leads and the housing having a passageway through which the leads of the laser transmitter pass by the interior wall for coupling the laser transmitter to the circuit board.

18. The laser transponder of claim 16 wherein the housing includes a plurality of detachable connectors that enable the laser transponder to be selectively attached and detached from the vehicle.

19. The laser transponder of claim 18 wherein the housing has first and second ends for coupling the housing to the moving vehicle, the first and second emds being opposite each other, each of the first and second ends having one of the detachable connectors, the connectors being structured for selecting pivoting the housing about a line extending through the housing between the first and second ends.

20. The laser transponder of claim 16 wherein the transmitter lens is a landscape lens having an horizontal optical power along a horizontal plane and a vertical optical power along a vertical plane, the horizontal optical power being different than the vertical optical power.

21. The laser transponder of claim 16 wherein the laser transmitter transmits the jamming laser beam along a transmitter optical axis and the transmitter lens is positioned along the transmitter optical axis, the transmitter lens having an optical axis that is perpendicular to a front side of the housing so that the transmitter lens directs the jamming laser beam perpendicular to the front side and substantially along the optical axis of the transmitter lens.

22. The laser transponder of claim 16 wherein the housing includes a main body and a cover that is releasably attached to the main body, the laser transmitter and laser detector being releasably coupled to the main body in position such that laser transmitter and laser detector can be removed from the main body and replaced when the cover is detached from the main body.

23. A method of manufacturing a laser transponder for disabling a laser-based speed monitor, the speed monitor being of a type that transmits a monitor laser beam at a moving vehicle, receives a reflected laser beam from the moving vehicle, and determines the speed of the moving vehicle based on the time elapsed between transmitting the monitor laser beam and receiving the reflected laser beam, the method comprising:

providing a housing having an aperture therein;

attaching a laser detector to the housing, the laser detector being structured to detect the monitor laser beam transmitted by the speed monitor at the moving vehicle;

attaching a laser transmitter to the housing, the laser transmitter being configured to transmit to the speed monitor a jamming laser beam in response to the laser detector detecting the monitor laser beam, the jamming laser beam being configured to disable the speed monitor, the laser transmitter being positioned within the housing to direct the jamming laser beam through the aperture;

directing a laser beam from the laser transmitter through the aperture toward a target positioned perpendicular to the laser transmitter in both an elevational and a horizontal plane;

compensating for a directional inaccuracy in the laser transmitter by moving a transmitter lens between the laser transmitter and the target into a position that directs the laser beam directly at the target so that the laser beam hits the target; and affixing the transmitter lens to the housing in the position that directs the laser beam directly at the target.

* * * * *